July 11, 1939.　　　P. E. GASQUE　　　2,166,050
ARTIFICIAL MINNOW
Filed Feb. 23, 1938
Fig. 1.
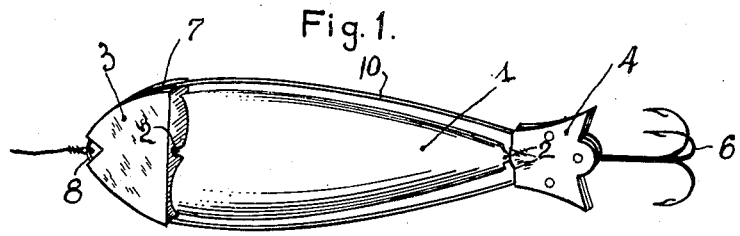
Fig. 2
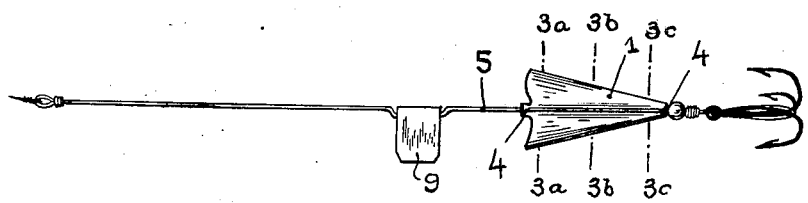
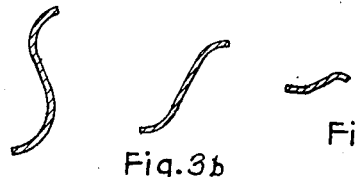
Fig. 3a　Fig. 3b　Fig. 3c
INVENTOR
Paul E. Gasque.
By William C. Linton.
Atty.

Patented July 11, 1939

2,166,050

UNITED STATES PATENT OFFICE 2,166,050

ARTIFICIAL MINNOW

Paul Emile Gasque, Vincennes, France

Application February 23, 1938, Serial No. 192,101
In France February 23, 1937

6 Claims. (Cl. 43—47)

The present invention relates to improvements in artificial minnows which are used as bait for fishing by casting, or the like.

The said improvements consist, in principle, in giving to a propeller or spoon which rotates by the effect of the relative movement of the water, a section having the form of an S upon the whole length of a helical generatrix which section gradually diminishes in extent and curvature from the front to the rear of the apparatus.

An object of the present invention is to provide an apparatus simulating a small fish and which apparatus is economical to produce.

Another object of the present invention is to provide an artificial minnow having as a member thereof a propeller which is so shaped as to have the minimum amount of resistance in passing through a body of water.

A still further object of the present invention is to provide an artificial minnow having as a member thereof a propeller which vibrates to imitate the rotation of a small fish in flight.

And a still further object is to provide a device simulating a small fish which is so constructed as to have horizontal movement through a body of water.

Further objects of the invention will be set forth in the following description, with reference to the accompanying drawing:

Fig. 1 is a general view of a constructional form of an improved artificial lure, in conformity to the invention;

Fig. 2 is a like view of another form of construction;

Fig. 3a is a cross sectional view taken on line 3ᵃ—3ᵃ of the propeller of Fig. 2.

Fig. 3b is a cross sectional view taken on line 3ᵇ—3ᵇ of the propeller of Fig. 2.

Fig. 3c is a cross sectional view taken on line 3ᶜ—3ᶜ of the propeller of Fig. 2.

Referring to Figs. 1 to 3, the propeller or spoon 1 of the artificial lure possesses, upon the whole length of a helical generatrix having in principle the same length as the body of the artificial lure, a section having the form of an S whose extent, as well as its curvature, gradually diminish as shown in Figs. 3a, 3b and 3c. This shape permits the spoon 1 to rotate through the water with a minimum amount of resistance thereto.

In the embodiment shown in Fig. 1, the spoon 1 is formed having pointed lugs 2 at opposite ends thereof. Said spoon is also formed having its center of gravity eccentrically positioned for causing the spoon to vibrate when rotating. At the larger portion of said spoon is located a weighted member 3 simulating a fish head and having a bore formed in a side thereof for rotatably mounting one of said pointed lugs 2 therein. At the smaller end of said spoon is located a member 4 of a fish-tail configuration and also having a bore formed in a side thereof for receiving the other of said pointed lugs 2 for rotatably supporting the same. Said fish-tail member carries a fish hook 6 from the opposite side thereof. Said first mentioned side of said fish-tail member has two ends of a wire 10 secured at opposite extremities thereof. Said wire 10, which is shaped to form the periphery of a fish, has its head portion mounted within an indentation 7 around the curved side of said fish head member 3. Further, said fish head member has a lateral indentation 8 suggesting an open fish mouth, which permits the fishing-line to be wound around said wire 10 at this point for securing the artificial minnow to the line. Said wire 10 with the cooperation of spoon 1 maintains the fish head member 3 and fish-tail member 4 in their relative positions.

In the embodiment shown in Fig. 2, the spoon 1 comprises at each end eyelets 4 which rotatably engage upon the stiff wire 5 attached to the fishing-line. Fixedly mounted upon said wire 5 in front of spoon 1 is an extending keel plate 9 which, as the members shown are passing through water, tends to prohibit the rotation of wire 5 due to any frictional engagement the wire 5 may have with the spoon 1.

In both of these cases, the allure of the device is greatly increased, and further, the propeller in conformity to the invention has an advantage due to the fact that it can be stamped in a single operation and the pointed lugs 2, in the case of Fig. 1, can be formed in the same manner, and thus the cost price of the apparatus is reduced to a low figure.

Obviously the simple embodiments herein described and represented are not of a limitative nature, and it is possible, without departing from the principle of the invention, to modify, in any suitable manner, the number, form, nature, disposition and assembling of the several parts. For instance, the material of the rotatable part and of the bearings may be different, in order to still further reduce the resistance, the relative position of the bearings may be adjustable, for instance by a screw mounting of one of the bearings, etc.

I claim:

1. In an artificial lure for fishing purposes, a propeller which is rotatable by the movement of water, having an S-shaped section upon the whole length of a helical generatrix, which section diminishes gradually in extent and curvature from the front to the rear of the apparatus.

2. In an artificial lure, a propeller which is rotatable by the movement of water, having an S-shaped section upon the whole length of a helical generatrix, which section diminishes gradually in extent and curvature from the front to the rear of the apparatus, a support surrounding the said propeller, and fish-hooks secured to the said support.

3. In an artificial lure, a propeller which is rotatable by the movement of water, having an S-shaped section upon the whole length of a helical generatrix, which section diminishes gradually in extent and curvature from the front to the rear of the apparatus, a support surrounding the said propeller, fish-hooks secured to the said support, and a pivoted connection, with pointed members, between the said propeller and the said support.

4. In an artificial lure, a support, a propeller which is rotatable by the movement of water, having an S-shaped section upon the whole length of a helical generatrix, which section diminishes gradually in extent and curvature from the front to the rear of the apparatus, the centre of gravity of the said propeller being eccentrically positioned for causing the vibration thereof and fish-hooks secured to the said support.

5. In an artificial lure, a propeller which is rotatable by the movement of water, having an S-shaped section upon the whole length of a helical generatrix, which section diminishes gradually in extent and curvature from the front to the rear of the apparatus, a support surrounding the said propeller and comprising a heavy mass, and fish-hooks secured to the said support.

6. In an artificial lure, a propeller which is rotatable by the movement of water, having an S-shaped section upon the whole length of a helical generatrix, which section diminishes gradually in extent and curvature from the front to the rear of the apparatus, said propeller having the general appearance of a small fish, a support surrounding the said propeller, and fish-hooks secured to the said support.

PAUL EMILE GASQUE.